US008925516B2

(12) United States Patent
Daman

(10) Patent No.: US 8,925,516 B2
(45) Date of Patent: Jan. 6, 2015

(54) ROTARY ENGINE

(76) Inventor: Todd Daman, Colorado Springs, CO (US)

( * ) Notice: Subject to any disclaimer, the term of this patent is extended or adjusted under 35 U.S.C. 154(b) by 603 days.

(21) Appl. No.: 13/195,361

(22) Filed: Aug. 1, 2011

(65) Prior Publication Data
US 2013/0032121 A1 Feb. 7, 2013

(51) Int. Cl.
*F02B 53/00* (2006.01)
*F02B 53/10* (2006.01)
*F02B 53/04* (2006.01)

(52) U.S. Cl.
CPC . *F02B 53/00* (2013.01); *Y02T 10/17* (2013.01)
USPC ........... 123/243; 123/200; 123/205; 123/208; 123/218; 123/241

(58) Field of Classification Search
CPC .......... F02B 53/00; F02B 43/10; F02B 55/10; F01C 21/18
USPC ................................... 123/243, 241
See application file for complete search history.

(56) References Cited

U.S. PATENT DOCUMENTS

| | | | | | |
|---|---|---|---|---|---|
| 3,205,875 | A | * | 9/1965 | Praxmarer et al. | 123/243 |
| 3,825,375 | A | * | 7/1974 | Deane | 418/61.2 |
| 3,895,609 | A | * | 7/1975 | Armstrong | 123/235 |
| 3,987,760 | A | * | 10/1976 | Kanaoka | 123/219 |
| 4,230,088 | A | * | 10/1980 | Southard | 123/203 |
| 4,519,206 | A | * | 5/1985 | van Michaels | 60/39.54 |
| 4,566,412 | A | * | 1/1986 | Tadokoro et al. | 123/216 |
| 6,401,687 | B1 | * | 6/2002 | Kozlov et al. | 123/243 |
| 2006/0207546 | A1 | * | 9/2006 | Bechtel | 123/241 |
| 2007/0034426 | A1 | * | 2/2007 | Akamatsu et al. | 180/65.2 |
| 2008/0029059 | A1 | * | 2/2008 | Isbrecht | 123/203 |
| 2008/0141974 | A1 | * | 6/2008 | Bechtel | 123/243 |
| 2008/0178572 | A1 | * | 7/2008 | VanHolstyn | 60/39.77 |
| 2010/0275876 | A1 | * | 11/2010 | Reid | 123/200 |

* cited by examiner

*Primary Examiner* — Thomas Denion
*Assistant Examiner* — Jessica Kebea
(74) *Attorney, Agent, or Firm* — Kilpatrick Townsend & Stockton LLP

(57) ABSTRACT

According to the invention, a rotary engine is disclosed. The rotary engine may include a body, a rotor, and an ignition element. The body may define a rotor cavity, an intake channel, and a first exhaust channel. The rotor may be disposed within the rotor cavity and may define at least one chamber. Each chamber may receive a fuel from the intake channel when the rotor is in a first position. Each chamber may also at least partially contain combustion of the fuel when the rotor is in a second position. Each chamber may further output an exhaust to the first exhaust channel when the rotor is in a third position. The ignition element may be in communication with each chamber when each chamber is in the second position.

20 Claims, 4 Drawing Sheets

ROTARY ENGINE

BACKGROUND OF THE INVENTION

This invention relates generally to rotational motion generation. More specifically the invention relates to combustion engines.

BRIEF DESCRIPTION OF THE INVENTION

In one embodiment, a rotary engine is provided. The rotary engine may include a body, a rotor, and an ignition element. The body may define a rotor cavity, an intake channel, and a first exhaust channel. The rotor may be disposed within the rotor cavity and may define at least one chamber. Each chamber may receive a fuel from the intake channel when the rotor is in a first position. Each chamber may also at least partially contain combustion of the fuel when the rotor is in a second position. Each chamber may further output an exhaust to the first exhaust channel when the rotor is in a third position. The ignition element may be in communication with each chamber when each chamber is in the second position.

In some embodiments, the rotor may include a first face a second face and an edge between the first face and the second face. The chamber or chambers defined by the rotor may include an intake port through which to receive the fuel. The intake port may be located on the edge of the rotor. The chamber or chambers defined by the rotor may also include a first exhaust port through which to pass the exhaust to the first exhaust channel. The first exhaust port may be located on the first face.

In some embodiments, the body may further define a second exhaust channel. In these and other embodiments, the chamber may also include a second exhaust port through which to pass the exhaust to the second exhaust channel. The second exhaust port may be located on the second face.

In some embodiments, the chamber may include a concave forward face. In these and other embodiments, the chamber may include a convex rear face. In these or other embodiments, the chamber may have a tear drop shape with at least one exhaust port at a tail of the tear drop shape.

In some embodiments, the rotary engine may further include a fuel source in communication with the intake channel. In some embodiments, the fuel source may include a water electrolysis device, with the fuel including hydrogen and oxygen gas. In other embodiments, any combustible fuel may be used.

In some embodiments, the body of the rotary engine may include a plurality of layers. For example, in one embodiment, the plurality of layers may include three layers. The first layer may define at least a first portion of the first exhaust channel. The second layer may define at least a second portion of the first exhaust channel, and may be coupled with the first layer. The third layer may define at least a portion of the rotor cavity and at least a portion of the intake channel, and may be coupled with the second layer.

In some embodiments, the body may further include a fourth a fifth layer. In these and other embodiments, the body may define a second exhaust channel, with the fourth layer defining at least a portion of the second exhaust channel. The fourth layer may be coupled with the third layer. The fifth layer may define at least a portion of the second exhaust channel, and may be coupled with the fourth layer.

In some embodiments, the ignition element may include a spark plug or a glow plug. Possibly to prevent premature ignition of fuel in the chamber, some embodiments may have bodies which define cooling channels. In these embodiments, the cooling channel may be located along a perimeter of the rotor cavity between the first position, where intake occurs, and the second position, where combustion and/or exhaust occurs.

In some embodiments, the rotor may define a single chamber. In other embodiments, the rotor may define multiple chambers, for example, two, three, four, or more chambers. The number of chambers may be limited by the size or the rotor and/or the size and shape of the chambers. In some embodiments, each of the chambers will be substantially identical in shape, while in other embodiments the chambers may be shaped differently.

BRIEF DESCRIPTION OF THE DRAWINGS

The present invention is described in conjunction with the appended figures.

Figure 1:
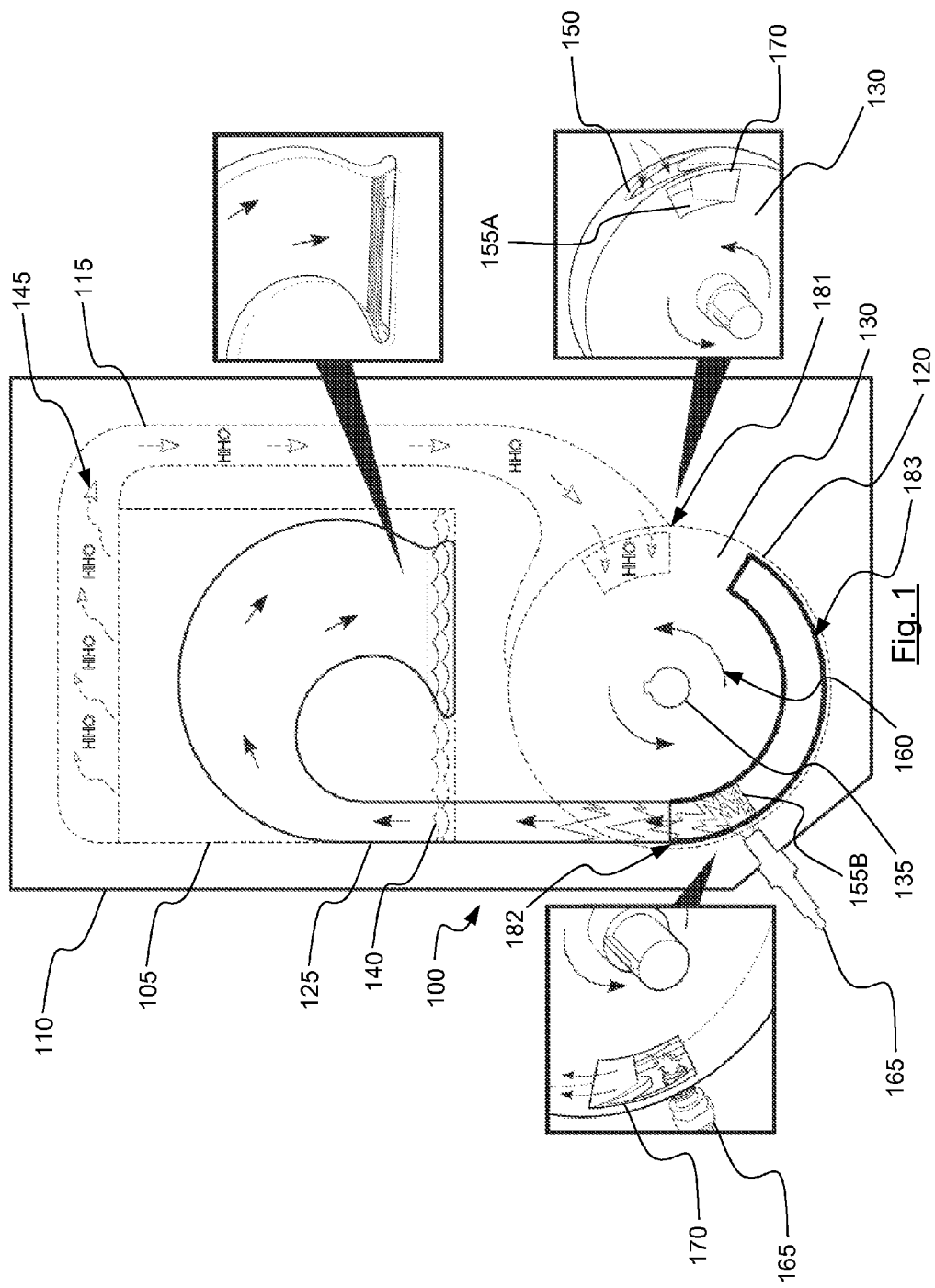
FIG. 1 is a side view of an embodiment of the invention having a rotary engine and water fuel cell.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, well-known circuits, systems, processes, structures, techniques, and other elements of the invention may be shown without unnecessary detail in order to avoid obscuring the embodiments.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a transitory or non-transitory machine readable medium. A processor(s) may perform the necessary tasks.

In one embodiment of the invention, a rotary engine is provided. The rotary engine may include a body, a rotor, and an ignition element.

The body may define a rotor cavity, an intake channel, and a first exhaust channel. The rotor may be disposed within the rotor cavity and may define at least one chamber. Each chamber may receive a fuel from the intake channel when the rotor is in a first position. Each chamber may also at least partially contain combustion of the fuel when the rotor is in a second position. Each chamber may further output an exhaust to the first exhaust channel when the rotor is in a third position. The ignition element may be in communication with each chamber when each chamber is in the second position.

In some embodiments, the rotor may include a first face a second face and an edge between the first face and the second face. The chamber or chambers defined by the rotor may include an intake port through which to receive the fuel. The intake port may be located on the edge of the rotor. The chamber or chambers defined by the rotor may also include a first exhaust port through which to pass the exhaust to the first exhaust channel. The first exhaust port may be located on the first face.

In some embodiments, the body may further define a second exhaust channel. In these and other embodiments, the chamber may also include a second exhaust port through which to pass the exhaust to the second exhaust channel. The second exhaust port may be located on the second face.

In some embodiments, the chamber may include a concave forward face. In these and other embodiments, the chamber may include a convex rear face. In these or other embodiments, the chamber may have a tear drop shape with at least one exhaust port at a tail of the tear drop shape.

In some embodiments, the rotary engine may further include a fuel source in communication with the intake channel. In some embodiments, the fuel source may include a water electrolysis device, with the fuel including hydrogen and oxygen gas.

In some embodiments, the body of the rotary engine may include a plurality of layers. For example, in one embodiment, the plurality of layers may include three layers. The first layer may define at least a first portion of the first exhaust channel. The second layer may define at least a second portion of the first exhaust channel, and may be coupled with the first layer. The third layer may define at least a portion of the rotor cavity and at least a portion of the intake channel, and may be coupled with the second layer.

In some embodiments, the body may further include a fourth a fifth layer. In these and other embodiments, the body may define a second exhaust channel, with the fourth layer defining at least a portion of the second exhaust channel. The fourth layer may be coupled with the third layer. The fifth layer may define at least a portion of the second exhaust channel, and may be coupled with the fourth layer.

In some embodiments, the ignition element may include a spark plug or a glow plug. Possibly to prevent premature ignition of fuel in the chamber, some embodiments may have bodies which define cooling channels. In these embodiments, the cooling channel may be located along a perimeter of the rotor cavity between the first position, where intake occurs, and the second position, where combustion and/or exhaust occurs.

In some embodiments, the rotor may define a single chamber. In other embodiments, the rotor may define multiple chambers, for example, two, three, four, or more chambers. The number of chambers may be limited by the size or the rotor and/or the size and shape of the chambers. In some embodiments, each of the chambers will be substantially identical in shape, while in other embodiments the chambers may be shaped differently.

Turning now to FIG. 1, a side view of an embodiment of the invention having a rotary engine 100 and water fuel cell 105 is shown. In this embodiment, the body 110 of rotary engine 100 defines a location for fuel cell 105, intake channel 115, rotor cavity 120, and exhaust channels 125. Rotor 130 is disposed in rotor cavity 120, and rotates about keyed shaft 135. The water fuel cell 105 may be an electrolysis device which separates liquid water into gaseous hydrogen and oxygen for combustion.

The process of rotary engine 100 begins when water 140 at fuel cell 105 is converted into fuel (here hydrogen and oxygen gas), and exits fuel cell 105 into intake channel 115 as shown by directional arrows 145. The fuel flows through intake channel 115 to rotor 130 and enters the intake port 150 of combustion chamber 155.

Rotor 130 rotates counter clockwise as shown by directional arrows 160. As rotor 130 rotates from the first position 181 where intake occurs, eventually chamber 155 reaches a second position 182 near ignition element 165. Ignition element 165 is in operable communication with intake port 150 such that intake port 150 acts as an ignition port in the second position 182, but an intake port 150 in the first position 181.

Ignition element 165 may be controlled by an ignition subsystem which detects and monitors the rotational position of rotor 130 and fires ignition element 165 when rotor 130 is in a position where chamber 155 is in position at ignition element 165. Note that ignition element 165 will therefore fire at multiple times during a complete rotation of rotor 130, depending on the number of chambers 155 in rotor 130. Here, rotor 130 is shown having two chambers 155, but could have more or less in other embodiments.

Exhaust from the combustion process flows out exhaust ports 170 of chamber 155 to exhaust channels 125 at a third position 183. Exhaust ports 170 are located on each side of chamber 155, and consequently feed to two exhaust channels 125, one of each side of rotary engine 100 and fuel cell 105. Exhaust, in this embodiment water vapor from the combustion of hydrogen and oxygen gas, exits chamber 155 via exhaust ports 170 and flows through exhaust channel 125 to the reservoir beneath fuel cell 105. The process repeats itself over and over again to produce rotational motion output at shaft 135.

In some embodiments, exhaust channel 125 may flow to a storage vessel rather than directly back to water fuel cell 105. In other embodiments, especially those where an alternative fuel beyond hydrogen and oxygen gas is used, exhaust channel 125 may exit to the atmosphere, possibly via a catalytic converter, muffler, or other gaseous characteristic altering device. In some embodiments, depending on the fuel used, the exhaust may be beneficially recycled.

Figure 2:
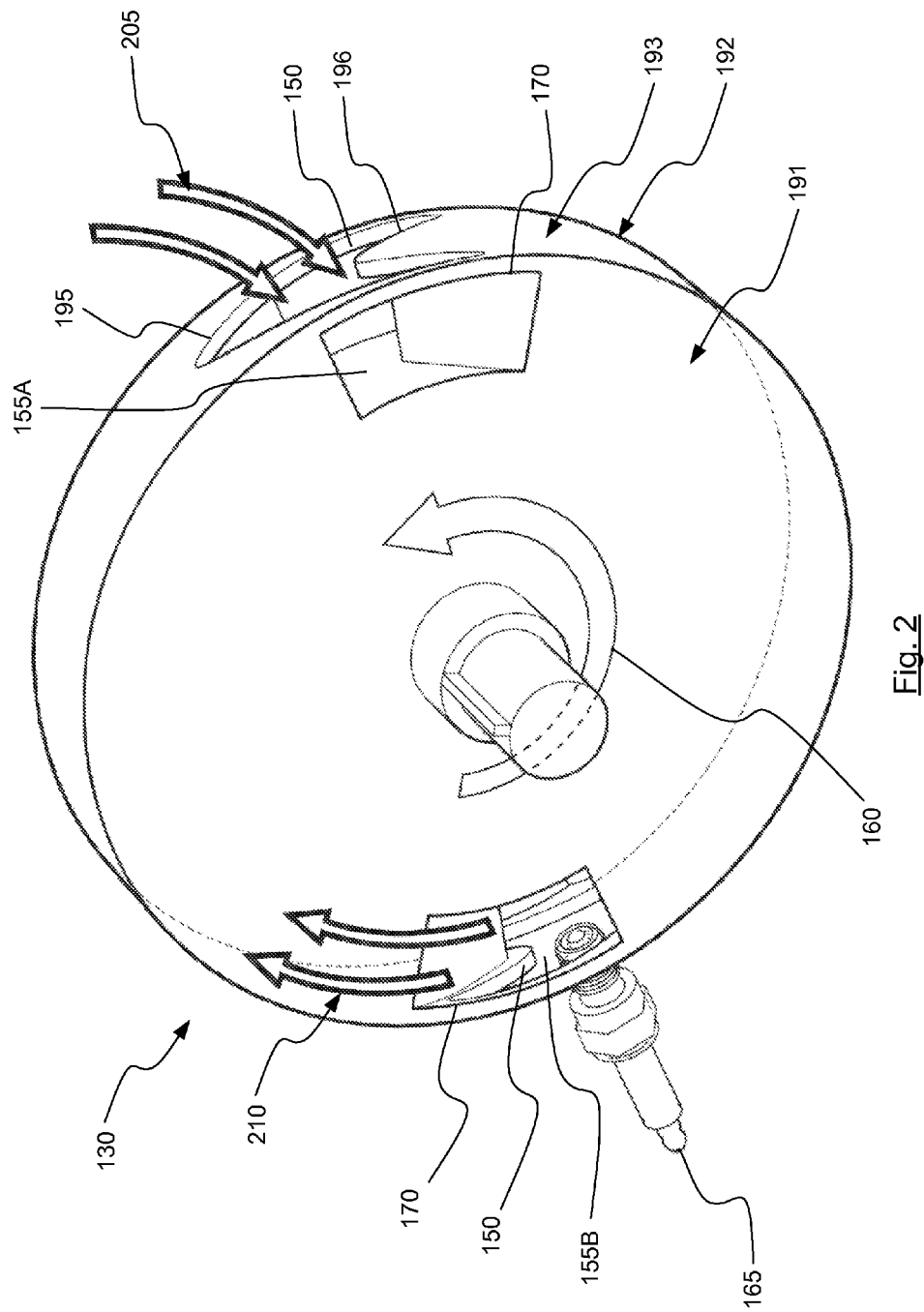
FIG. 2 is an axonometric close up view of one possible rotor from one embodiment of the invention.

FIG. 2 is an axonometric close up view of rotor 130 and ignition element 165 from FIG. 1. Rotor has a first face 191, a second face 192, and an edge 193. The entry of fuel via intake port 150 into chamber 155A is shown by directional arrows 205. The exhaust of exhaust via exhaust port 170 from chamber 155B is shown by directional arrows 210. Note that exhaust is also exiting chamber 155B on the opposite side of rotor 130. Chambers 155 have a convex forward face 195, and a concave rear face 196.

Figure 3:
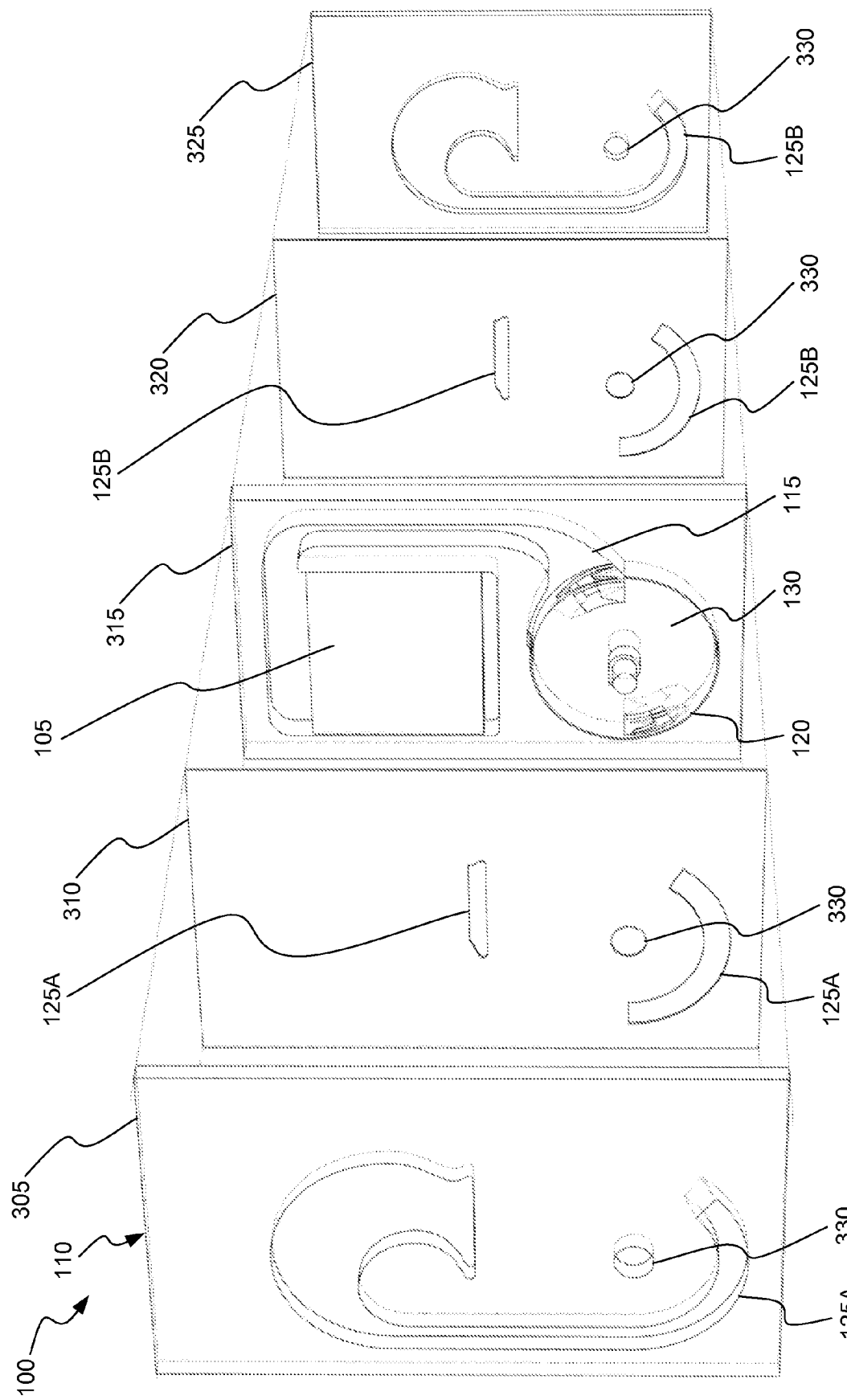
FIG. 3 is an axonometric exploded view of an embodiment of the invention having a rotary engine and water fuel cell.

FIG. 3 shows an axonometric exploded view of an embodiment of the invention having a rotary engine 100 and water fuel cell 105. Here, body 110 is shown split into five separate portions, a first layer 305, a second layer 310, a third layer 315, a fourth layer 320, and a fifth layer 325.

First layer 305 may define at least a portion of a first exhaust channel 125A, as well as shaft channel aperture 330. Second layer 310 may also define at least a portion of first exhaust channel 125A.

Third layer 315 may define rotor cavity 120 in which rotor 130 is disposed. Second layer 315 may also define intake channel 115. Finally, second layer 315 may define a location for fuel cell 105 which is able to feed from exhaust channels 125 and to intake channel 115.

First layer 320 may define at least a portion of a second exhaust channel 125B, as well as shaft channel aperture 330. Fifth layer 310 may also define at least a portion of second exhaust channel 125B.

Rotary engine 100 as shown in FIG. 3 may also include end-sandwich layers (not shown) to close up engine 100. These end-sandwich panels may define shaft channel apertures on one or both sides of rotary engine 100 to transmit the rotational motion generated thereby. All layers may be coupled together by any means known in the art.

Figure 4:
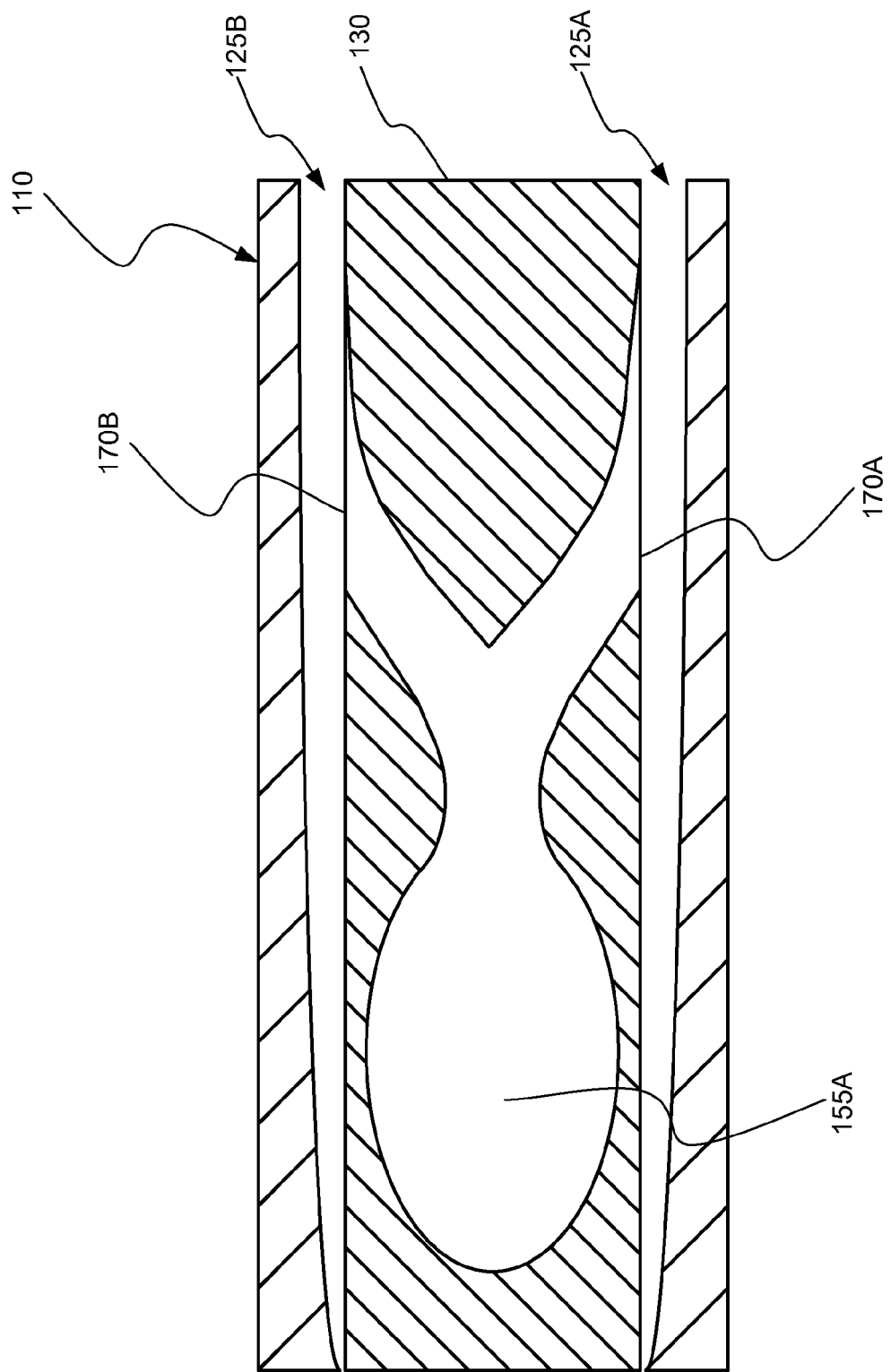
FIG. 4 is a plan view of an alternative combustion chamber of the invention.

FIG. 4 is a plan view of an alternative combustion chamber 155A of the invention. In this view, the edge of rotor 130 is shown from the intake port side. The tear shape of chamber 155A may have one or more exhaust ports 170, which are able to feed to exhaust channels 125 in body 110. Different shaped chambers 155 may allow for optimization of rotational motion generation from the combustion of the fuel in chamber 155.

The invention has now been described in detail for the purposes of clarity and understanding. However, it will be appreciated that certain changes and modifications may be practiced within the scope of the appended claims.

What is claimed is:

1. A rotary engine, wherein the rotary engine comprises:
   a body defining:
      a rotor cavity;
      an intake channel; and
      a first exhaust channel;
   a rotor disposed within the rotor cavity, wherein:
      the rotor has a first face, a second face, and an edge between the first face and the second face;
      the first face and the second face have a circular perimeter; and
      the rotor defines at least one chamber within the rotor, wherein:
         each chamber has an intake port on the edge of the rotor;
         each chamber receives a fuel from the intake channel via the intake port when the rotor is in a first position;
         each chamber at least partially contains combustion of the fuel when the rotor is in a second position;
         each chamber outputs an exhaust to the first exhaust channel when the rotor is in a third position; and
         each chamber comprises a first exhaust port through which to pass the exhaust to the first exhaust channel, wherein the first exhaust port is located on the first face; and
   an ignition element in communication with each chamber when each chamber is in the second position.

2. The rotary engine of claim 1, wherein:
   the body further defines:
      a second exhaust channel; and
   each chamber further comprises:
      a second exhaust port through which to pass the exhaust to the second exhaust channel.

3. The rotary engine of claim 2, wherein the second exhaust port is located on the second face.

4. The rotary engine of claim 1, wherein the chamber comprises a convex forward face in a direction of rotation of the rotor during combustion.

5. The rotary engine of claim 1, wherein the chamber comprises a concave rear face in a direction opposite rotation of the rotor during combustion.

6. The rotary engine of claim 1, wherein the chamber comprises a tear drop shape with two exhaust ports at a tail of the tear drop shape.

7. The rotary engine of claim 1, wherein the rotary engine further comprises:
   a fuel source in communication with the intake channel.

8. The rotary engine of claim 7, wherein the fuel source comprises a water electrolysis device, and the fuel comprises hydrogen gas and oxygen gas.

9. The rotary engine of claim 1, wherein the body comprises a plurality of layers.

10. The rotary engine of claim 9, wherein the plurality of layers comprise:
    a first planar layer defining at least a first portion of the first exhaust channel;
    a second planar layer defining at least a second portion of the first exhaust channel, wherein the second layer is coupled with the first layer; and
    a third planar layer defining at least a portion of the rotor cavity and at least a portion of the intake channel, wherein the third layer is coupled with the second layer, wherein:
       the first planar layer is not coplanar with the second planar layer and the third planar layer;
       the second planar layer is not coplanar with the first planar layer and the third planar layer; and
       the third planar layer is not coplanar with the first planar layer and the second planar layer.

11. The rotary engine of claim 10, wherein:
    the body further defines a second exhaust channel; and
    the plurality of layers further comprises:
       a fourth planar layer defining at least a portion of the second exhaust channel, wherein the fourth layer is coupled with the third layer; and
       a fifth planar layer defining at least a portion of the second exhaust channel, wherein the fifth layer is coupled with the fourth layer, wherein:
          the fourth planar layer is not coplanar with the first planar layer, the second planar layer, the third planar layer, and the fourth planar layer; and
          the fifth planar layer is not coplanar with the first planar layer, the second planar layer, the third planar layer, and the fifth planar layer.

12. The rotary engine of claim 1, wherein the ignition element comprises a spark plug or a glow plug.

13. The rotary engine of claim 1, wherein the rotor defining at least one chamber comprises the rotor defining two chambers.

14. A rotary engine, wherein the rotary engine comprises:
    a body comprising a plurality of layers, wherein:
       the body defines:
          a rotor cavity;
          an intake channel; and
          a first exhaust channel; and
       the plurality of layers comprises:
          a first planar layer defining at least a first portion of the first exhaust channel;
          a second planar layer defining at least a second portion of the first exhaust channel, wherein the second layer is coupled with the first layer; and a third planar layer defining at least a portion of the rotor cavity and at least a portion of the intake channel, wherein the third layer is coupled with the second layer, wherein:
  the first planar layer is not coplanar with the second planar layer and the third planar layer;
  the second planar layer is not coplanar with the first planar layer and the third planar layer; and
  the third planar layer is not coplanar with the first planar layer and the second planar layer;
a rotor disposed within the rotor cavity, wherein:
  the rotor has a first face, a second face, and an edge between the first face and the second face;
  the first face and the second face have a circular perimeter; and
  the rotor defines at least one chamber within the rotor, wherein:
    each chamber has an intake port on the edge of the rotor;
    each chamber receives a fuel from the intake channel via the intake port when the rotor is in a first position;
    each chamber at least partially contains combustion of the fuel when the rotor is in a second position;
    each chamber outputs an exhaust to the first exhaust channel when the rotor is in a third position; and
an ignition element in communication with each chamber when each chamber is in the second position.

15. The rotary engine of claim 14, wherein each chamber comprises a first exhaust port through which to pass the exhaust to the first exhaust channel.

16. The rotary engine of claim 15, wherein the first exhaust port is located on the first face.

17. The rotary engine of claim 15, wherein
the body further defines:
  a second exhaust channel; and
each chamber further comprises:
  a second exhaust port through which to pass the exhaust to the second exhaust channel.

18. The rotary engine of claim 17, wherein the second exhaust port is located on the second face.

19. The rotary engine of claim 14, wherein:
the body further defines a second exhaust channel; and
the plurality of layers further comprises:
  a fourth planar layer defining at least a portion of the second exhaust channel, wherein the fourth layer is coupled with the third layer; and
  a fifth planar layer defining at least a portion of the second exhaust channel, wherein the fifth layer is coupled with the fourth layer, wherein:
    the fourth planar layer is not coplanar with the first planar layer, the second planar layer, the third planar layer, and the fourth planar layer; and
    the fifth planar layer is not coplanar with the first planar layer, the second planar layer, the third planar layer, and the fifth planar layer.

20. The rotary engine of claim 14, wherein the rotor defining at least one chamber comprises the rotor defining two chambers.

* * * * *